(12) United States Patent
Watanabe et al.

(10) Patent No.: US 8,052,066 B2
(45) Date of Patent: Nov. 8, 2011

(54) HEATING CONTROL SYSTEM FOR VEHICLE

(75) Inventors: Hideto Watanabe, Toyota (JP); Yasuo Shimizu, Toki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1210 days.

(21) Appl. No.: 11/578,705

(22) PCT Filed: Apr. 5, 2005

(86) PCT No.: PCT/JP2005/007002
§ 371 (c)(1), (2), (4) Date: Oct. 17, 2006

(87) PCT Pub. No.: WO2005/108134
PCT Pub. Date: Nov. 17, 2005

(65) Prior Publication Data
US 2007/0246554 A1     Oct. 25, 2007

(30) Foreign Application Priority Data

May 10, 2004   (JP) .................................. 2004-140086

(51) Int. Cl.
*B60H 1/00* (2006.01)
(52) U.S. Cl. .............. 237/12.3 B; 237/2 A; 237/12.3 A; 237/12.3 R; 237/34; 62/132; 62/133; 62/190; 123/41.1; 123/41.12; 60/670
(58) Field of Classification Search .................. 237/2 A, 237/12.3 B, 34, 12.3 A, 12.3 R; 60/670; 180/65.25; 62/190, 132, 133, 243, 238.6, 62/175, 239; 123/41.1, 41.12, 41.44, 41.01, 123/41.02, 41.31; 122/26
See application file for complete search history.

(56) References Cited

U.S. PATENT DOCUMENTS
5,497,941 A * 3/1996 Numazawa et al. .......... 237/2 A
(Continued)

FOREIGN PATENT DOCUMENTS
JP   A 59-006113   1/1984
(Continued)

OTHER PUBLICATIONS
Japanese Office Action for Application No. 2004-140086, issued Dec. 22, 2009.
(Continued)

*Primary Examiner* — Steven B McAllister
*Assistant Examiner* — Avinash Savani
(74) *Attorney, Agent, or Firm* — Oliff & Berridge, PLC

(57) ABSTRACT

A hybrid vehicle can be driven using both of respective driving forces from an engine and a motor. A heating mechanism of an air conditioning apparatus uses thermal energy from cooling water of the engine to heat the interior of a passenger compartment. An ECU takes into consideration engine efficiency from the standpoint of fuel economy enhancement to primarily determine the driving force share ratio between the engine and the motor. Further, the ECU calculates a preset temperature corresponding to a cooling water temperature necessary for desired heating as well as a control target temperature in which the preset temperature is reflected, and corrects the primarily determined driving force share ratio to increase the share of the driving force of the engine by an amount according to a deviation between the cooling water temperature measured by a water temperature sensor and the control target temperature. Heating performance can thus be ensured promptly without deterioration of fuel economy.

5 Claims, 4 Drawing Sheets

U.S. PATENT DOCUMENTS

| | | | |
|---|---|---|---|
| 5,884,243 A * | 3/1999 | Taniguchi et al. | 702/183 |
| 6,018,694 A | 1/2000 | Egami et al. | |
| 6,265,692 B1 * | 7/2001 | Umebayahi et al. | 219/202 |
| 6,344,732 B2 * | 2/2002 | Suzuki | 320/132 |
| 6,934,610 B2 * | 8/2005 | Wakashiro et al. | 701/22 |
| 2001/0032621 A1 | 10/2001 | Kojima et al. | |
| 2002/0007975 A1 * | 1/2002 | Naito et al. | 180/65.3 |
| 2004/0093149 A1 | 5/2004 | Hara | |
| 2005/0109031 A1 * | 5/2005 | Inaba et al. | 60/670 |

FOREIGN PATENT DOCUMENTS

| | | |
|---|---|---|
| JP | A 09-233601 | 9/1997 |
| JP | A 10-203145 | 8/1998 |
| JP | A 11-190213 | 7/1999 |
| JP | A-2000-211350 | 8/2000 |
| JP | A 2001-213152 | 8/2001 |
| JP | A-2002-176794 | 6/2002 |
| JP | A-2004-27991 | 1/2004 |

OTHER PUBLICATIONS

Jul. 27, 2010 Office Action issued in Japanese Patent Application No. 2004-140086 (with translation).

* cited by examiner

HEATING CONTROL SYSTEM FOR VEHICLE

TECHNICAL FIELD

The present invention relates to a heating control system for vehicles. In particular, the present invention relates to a heating control system applied to a vehicle that has an air conditioning apparatus using thermal energy derived from cooling water of an internal combustion engine so as to perform heating.

BACKGROUND ART

Hybrid vehicles have recently been developed that include an internal combustion engine generating driving force from thermal energy produced by burning such a fuel as gasoline as well as an electric motor generating driving force from electrical energy. Even when the engine is stopped, the hybrid vehicle can run by driving the electric motor with electric power supplied from a battery that is charged in advance or charged with electric power generated by the engine while the vehicle is running.

When the hybrid vehicle runs by using the driving force from the engine, the electric motor is driven in an auxiliary manner to enhance combustion efficiency of the engine and thereby allow the engine to operate at a most efficient point all the time. Fuel consumption and the amount of carbon dioxide in exhaust gas can thus be reduced. Namely, low pollution and energy saving can simultaneously be achieved.

In the hybrid vehicle, the interior of the passenger compartment is heated by means of thermal energy derived from cooling water of the engine. Specifically, such a vehicle has a heating apparatus that supplies cooling water heated by waste heat from the engine to a heater core for heat exchange between the air to be blown into the passenger compartment and the cooling water.

As for the hybrid vehicle, however, heat generation from the engine is kept low since the engine is operated at the most efficient point, so that the temperature of the engine cooling water is also kept relatively low. Therefore, when high heating ability is required because of a low outside-air temperature, a problem arises that is insufficient heating ability of the configuration using the engine cooling water as a heat source.

In order to solve the aforementioned problem, Japanese Patent Laying-Open No. 09-233601 for example proposes a hybrid vehicle having necessary and sufficient heating performance. Specifically, when the hybrid vehicle is stopped or driven by the electric motor and the difference between a preset temperature of the air conditioner and a room temperature is equal to or larger than a criterion value that is determined according to the temperature of the engine cooling water, the internal combustion engine is forced to operate to obtain the above-described heating performance.

A similar technique is proposed for example by Japanese Patent Laying-Open No. 10-203145 that discloses a heating control apparatus for a hybrid vehicle. The hybrid vehicle has its engine operated at maximum efficiency. A temperature of the cooling water required for heating is used as a preset temperature. When the actual temperature of the cooling water does not reach the preset temperature, a request is made to change the operating point of the engine for the purpose of increasing the temperature of the engine cooling water.

The configuration of the hybrid vehicle disclosed in Japanese Patent Laying-Open No. 09-233601 ensures the heating performance by increasing the temperature of the cooling water through idling of the engine. Therefore, it takes some time to allow the temperature of the cooling water to reach a target value (preset temperature). Until the temperature of the cooling water reaches the preset temperature, the engine cannot be driven intermittently, resulting in increases in amount of exhaust gas and fuel consumption.

The configuration disclosed in Japanese Patent Laying-Open No. 10-203145 uses control for ensuring the heating performance by requesting a change of the operating point of the engine when it is necessary to increase the temperature of the cooling water. However, the control only makes a switch between the operation of changing the engine operating point and the operation of not changing the engine operating point. Thus, fine control based on the difference between the cooling water temperature and the preset temperature cannot be performed, and the time that is necessary for the engine water temperature to reach a target value cannot be made sufficiently shorter.

DISCLOSURE OF THE INVENTION

An object of the present invention is to provide a heating control system applied to vehicles such as hybrid vehicles and automobiles having an air conditioning apparatus that uses thermal energy derived from engine cooling water to perform heating, for quickly increasing the temperature of the cooling water as required to a preset temperature to promptly ensure heating performance and enhance fuel economy.

According to the present invention, a heating control system for a vehicle having an internal combustion engine generating driving force of the vehicle from thermal energy generated by burning fuel includes an air conditioning apparatus, a water temperature measurement unit, a control target temperature setting unit, and a water temperature increase unit. The air conditioning apparatus uses thermal energy derived from cooling water of the internal combustion engine. The water temperature measurement unit measures temperature of the cooling water. The control target temperature setting unit sets a control target temperature of the cooling water based on a preset temperature corresponding to a temperature of the cooling water that is necessary for performing heating by the air conditioning apparatus and based on a cooling water temperature measured by the water temperature measurement unit. The water temperature increase unit changes, when the cooling water temperature is lower than the preset temperature, operation of the internal combustion engine to allow an amount of heat generated by the internal combustion engine to increase, according to a deviation between the control target temperature and the cooling water temperature. The control target temperature setting unit sets the control target temperature at the preset temperature when a temperature difference between the preset temperature and the cooling water temperature is at most a predetermined value and sets the control target temperature higher than the preset temperature when the temperature difference is larger than the predetermined value.

Preferably, with the heating control system for the vehicle according to the present invention, the control target temperature setting unit sets a difference between the preset temperature and the control target temperature according to the temperature difference between the preset temperature and the cooling water temperature.

Preferably, with the heating control system for the vehicle according to the present invention, in a case where the vehicle further has an electric motor generating driving force of the vehicle from electrical energy, when the cooling water temperature is lower than the preset temperature, the water temperature increase unit determines a driving force share ratio that is a ratio between respective shares to be generated by the internal combustion engine and the electric motor, of driving force required by the vehicle as a whole, with the deviation reflected in the ratio.

In particular, the heating control system for the vehicle of the present invention having the configuration as described above further includes a driving force share determination unit for primarily determining the driving force share ratio in consideration of efficiency of the internal combustion engine. The water temperature increase unit increases, when the cooling water temperature is lower than the preset temperature, the ratio of the share to be generated by the internal combustion engine by an amount according to the deviation.

Preferably, with the heating control system for the vehicle according to the invention, when the cooling water temperature is lower than the control target temperature, the water temperature increase unit changes operating point of the internal combustion engine according to the deviation to decrease engine-generated torque while increasing number of revolutions of the internal combustion engine within a range in which output power of the internal combustion engine remains substantially the same.

According to the present invention, when the cooling water temperature of the internal combustion engine does not reach the preset temperature necessary for desired heating by the air conditioning apparatus, the heating control system for the vehicle increases the amount of heat generated from the internal combustion engine by an amount according to the control temperature deviation between the control target temperature determined based on the preset temperature and the cooling water temperature, and allows the temperature difference between the preset temperature and the cooling water temperature to be reflected in the setting of the control target temperature.

Thus, according to the control temperature deviation, the amount of increase of the heat generated from the internal combustion engine for increasing the cooling water temperature can variably be set so as to allow the cooling water temperature to promptly approach the preset temperature and reduce overshoot from the preset temperature. In this way, the fuel economy can be enhanced without excessive generation of waste heat from the internal combustion engine. Further, since the temperature difference between the preset temperature and the cooling water temperature is reflected in the setting of the control target temperature, the waste heat from the internal combustion engine can be increased in a region where the cooling water temperature is lower than the preset temperature, as compared with the case in which the control target temperature is fixed at the preset temperature. Thus, the cooling water temperature can more promptly be increased.

Furthermore, since the control target temperature is set so that the difference between the preset temperature and the control target temperature is the one according to the temperature difference between the preset temperature and the cooling water temperature, the prompt increase of the cooling water temperature and the reduction of overshoot from the preset temperature can simultaneously be achieved.

For the hybrid vehicle having an internal combustion engine and an electric motor, the cooling water temperature can promptly be increased to the preset temperature in a low-temperature condition by increasing the driving force share to be born by the internal combustion engine when the cooling water temperature is low, in which the control temperature deviation of the cooling water temperature from the control target temperature is reflected. Accordingly, the cooling water temperature promptly reaches the preset temperature to allow intermittent operation of the internal combustion engine to be implemented in an early stage and thereby improve fuel efficiency of the hybrid vehicle and promptly ensure the heating performance.

In particular, for the hybrid vehicle, according to the control temperature deviation, the increase of the driving force share to be born by the internal combustion engine is variably set to allow the cooling water temperature to immediately approach the preset temperature and reduce overshoot from the preset temperature. Accordingly, fuel economy can be enhanced without excessive waste heat generation from the internal combustion engine.

Moreover, for any vehicles other than the hybrid vehicle, the cooling water temperature can immediately be increased to the preset temperature in a low-temperature condition by changing the operating point of the internal combustion engine according to the control temperature deviation of the cooling water temperature from the control target temperature so that the engine-generated torque decreases while the engine rpm increases in a range in which the output power of the internal combustion engine remains substantially the same.

BEST MODES FOR CARRYING OUT THE INVENTION

Figure 1:
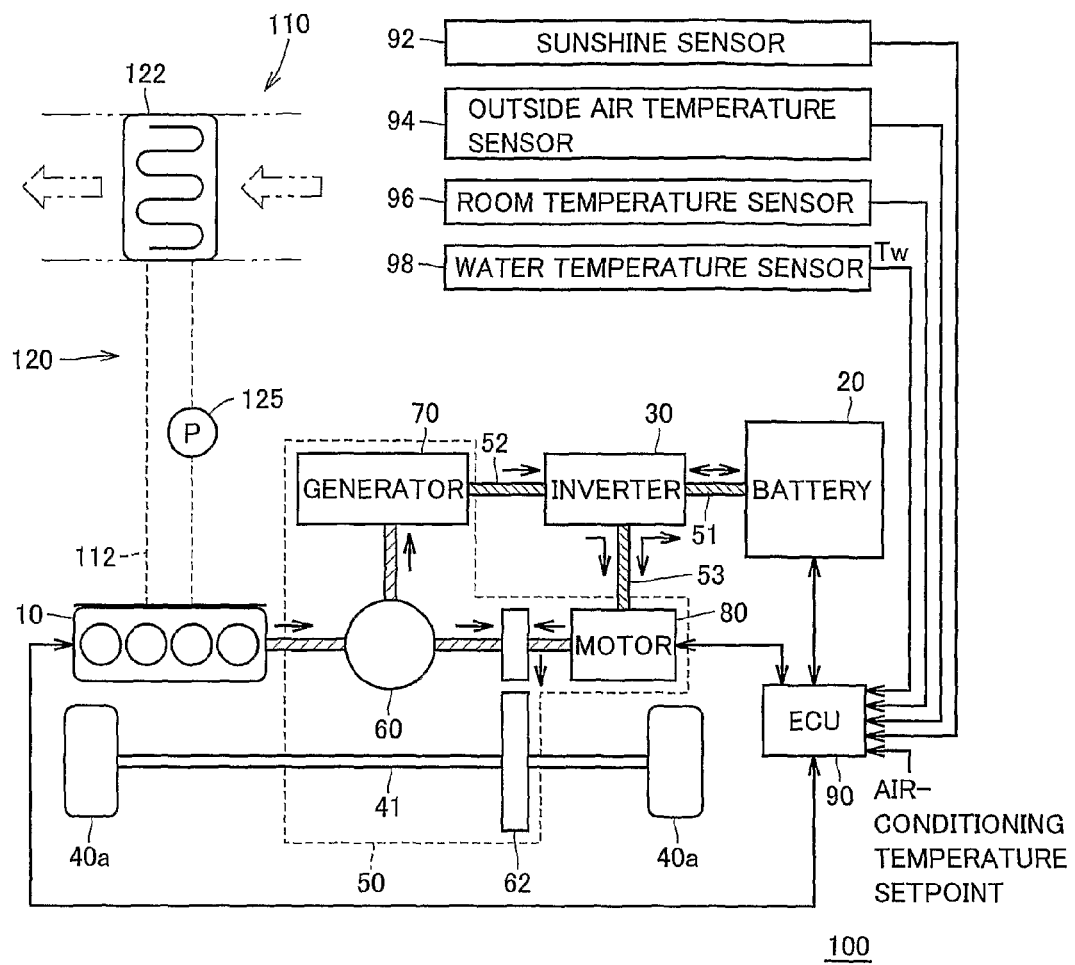
FIG. 1 is a block diagram showing an entire configuration of a hybrid vehicle having a heating control system according to the present invention.

An embodiment of the present invention is hereinafter described in detail with reference to the drawings. Here, like components are denoted by like reference characters and a description thereof is not repeated.

Referring to FIG. 1, a hybrid vehicle 100 having a heating control system of the present invention includes an engine 10, a battery 20, an inverter 30, wheels 40a, a transaxle 50, an electric control unit (ECU) 90, a sunshine sensor 92, an outside air temperature sensor 94, a room temperature sensor 96, a water temperature sensor 98, and an air conditioning apparatus 110.

Engine 10 uses, as an energy source, thermal energy produced by burning such a fuel as gasoline to generate driving force for wheels 40a. Battery 20 supplies DC electric power to an electric power line 51. Battery 20 is typically comprised of rechargeable secondary cell(s), like nickel hydrogen storage battery and lithium ion secondary battery.

Inverter 30 converts the DC electric power supplied from battery 20 to electric power line 51 into AC electric power to output the AC electric power to an electric power line 53. Inverter 30 also converts AC electric power supplied to electric power lines 52, 53 into DC electric power to output the DC electric power to electric power line 51.

Transaxle 50 has an integrated configuration of a transmission and an axle, and includes a power split device 60, a reduction gear 62, a generator 70, and a motor 80.

Although generator 70 and motor 80 are provided separately in this embodiment, a single electric motor may be provided that has both of respective functions of the motor and the generator.

Power split device 60 can transmit the driving force that is output from engine 10 through a path via reduction gear 62 to an axle 41 used for driving wheels and through a path to generator 70.

Generator 70 produces electric power through rotations caused by the driving force from engine 10 that is transmitted via power split device 60. The electric power produced by generator 70 is supplied via electric power line 52 to inverter 30 to be used for charging battery 20 or for driving motor 80.

Motor 80 is rotated by AC electric power supplied from inverter 30 to electric power line 53. Driving force generated by motor 80 is transmitted via reduction gear 62 to axle 41. In other words, motor 80 generates the driving force for the vehicle from the electrical energy.

In a regenerative braking mode, when motor 80 is rotated as wheels 40a are decelerated, electromotive force (AC electric power) generated at motor 80 is supplied to electric power line 53.

ECU 90 controls the whole operation of instruments and circuitry mounted on hybrid vehicle 100 in order to allow hybrid vehicle 100 to be driven in accordance with driver's instructions. ECU 90 is typically comprised of a microcomputer for example for performing predetermined sequences and predetermined operations that are programmed in advance.

Air conditioning apparatus 110 includes a cooing mechanism (not shown) using a refrigeration cycle of a general configuration including a compressor evaporator for example to cool and dehumidify air to be blown into the passenger compartment, as well as a heating mechanism 120 using cooling water of engine 10 (hereinafter simply referred to as "engine cooling water") to heat air to be blown into the passenger compartment. Here, for air conditioning apparatus 110, any of cooling mechanisms mounted not only on hybrid vehicles but also on various types of vehicles may be applied, and a detailed description of the cooling mechanism is not given in connection with this embodiment. Further, as an equipment configuration of heating mechanism 110, a conventional and known mechanism using engine cooling water is applicable.

Heating mechanism 120 of air conditioning apparatus 110 includes a cooling water pipe 112, a heater core 122 and a circulation pump 125. Circulation pump 125 operates under control by ECU 90. Circulation pump 125 is operated to allow the engine cooling water to be circulated via cooling water pipe 112 through a path including heater core 122. When the engine cooling water passes through heater core 122, heat exchange occurs to heat the air to be blown into the passenger compartment. In this way, air conditioning apparatus 110 uses the thermal energy of the engine cooling water to heat the inside of the passenger compartment.

To ECU 90, sunshine sensor 92, outside air temperature sensor 94 and room temperature sensor 96 that are used for detecting environmental conditions as well as water temperature sensor 98 for measuring temperature Tw of the engine cooling water (hereinafter also referred to simply as "cooling water temperature Tw") are connected. Further, to ECU 90, such air-conditioning conditions as air-conditioning temperature in the passenger compartment (air-conditioning temperature setpoint) and an operation mode (heating/cooling for example) of the air conditioning apparatus are provided.

The configuration shown in FIG. 1 has the following correspondence with that of the present invention. Engine 10 corresponds to "internal combustion engine" of the present invention, motor 80 corresponds to "electric motor" of the invention, air conditioning apparatus 110 corresponds to "air conditioning apparatus" of the invention, and water temperature sensor 98 corresponds to "water temperature measurement unit of the invention." Further, control operations corresponding respectively to "water temperature increase means," "control target temperature setting means" and "driving force share ratio determination means" are performed by ECU 90.

As discussed above, hybrid vehicle 100 uses in combination the driving force generated by engine 10 and the driving force generated by motor 80 from electrical energy to drive the vehicle with improved fuel economy.

When hybrid vehicle 100 runs under low-load conditions, for example, when the vehicle starts up, runs at a low speed or runs down a gently sloping road, hybrid vehicle 100 is basically driven by the driving force from motor 80 without operating the engine for avoiding a region where the engine efficiency is low.

Under normal running conditions, the driving force that is output from engine 10 is split by power split device 60 into driving force for wheels 40a and driving force for producing electric power by generator 70. The electric power generated by generator 70 is used for driving motor 80. Accordingly, under normal running conditions, the driving force from engine 10 is assisted by the driving force from motor 80 to drive wheels 40a. ECU 90 controls power split ratio of power split device 60, namely the ratio between respective driving forces to be supplied by engine 10 and motor 80 respectively (hereinafter referred to as "driving force share ratio"), to maximize the whole efficiency.

Under full-throttle conditions, electric power supplied from battery 20 is additionally used for driving motor 80 to further increase the driving force for wheels 40a.

Under deceleration and braking conditions, motor 80 is driven by wheels 40a to rotate and serve as an electric generator. The electric power recovered through the regenerative power generation of motor 80 is supplied via electric power line 53, inverter 30 and electric power line 51 to charge battery 20. Further, when the vehicle stops, engine 10 is automatically stopped.

As described above, according to driving conditions, the driving force share ratio between engine 10 and motor 80 is determined to satisfy an output power demand of the whole vehicle. Specifically, ECU 90 determines the driving force share ratio according to driving conditions in consideration of efficiency of engine 10 in terms of fuel economy.

Further, ECU 90 sets, based on the results of detection by sensors 92, 94, 96 that are used for detecting environmental conditions and based on an air-conditioning temperature setpoint, operating conditions of air conditioning apparatus 110 and controls heating mechanism 120 or the cooling mechanism to perform air-conditioning, thereby keeping the interior of the passenger compartment at the temperature setpoint.

In heating the interior of the passenger compartment, ECU 90 sets "preset temperature" that corresponds to a temperature of the engine cooling water necessary for heating the interior of the passenger compartment to an air-conditioning temperature setpoint, based on for example such environmental conditions as the outside air temperature, amount of solar radiation and temperature of the passenger compartment and based on the temperature setpoint. In other words, when the temperature of the engine cooling water is lower than the preset temperature, the air to be blown into the passenger compartment cannot be heated sufficiently, and consequently it would be felt that heating ability is insufficient.

In order to prevent such insufficient heating ability from arising, when the temperature of the engine cooling water is equal to or lower than a preset temperature and even when engine's operation is unnecessary for driving the vehicle, the conventional configuration disclosed in Japanese Patent Laying-Open No. 09-233601 controls engine 10 by idling engine 10 (no-load operation) to increase the temperature of the engine cooling water by the heat generated by engine 10.

Figure 2:
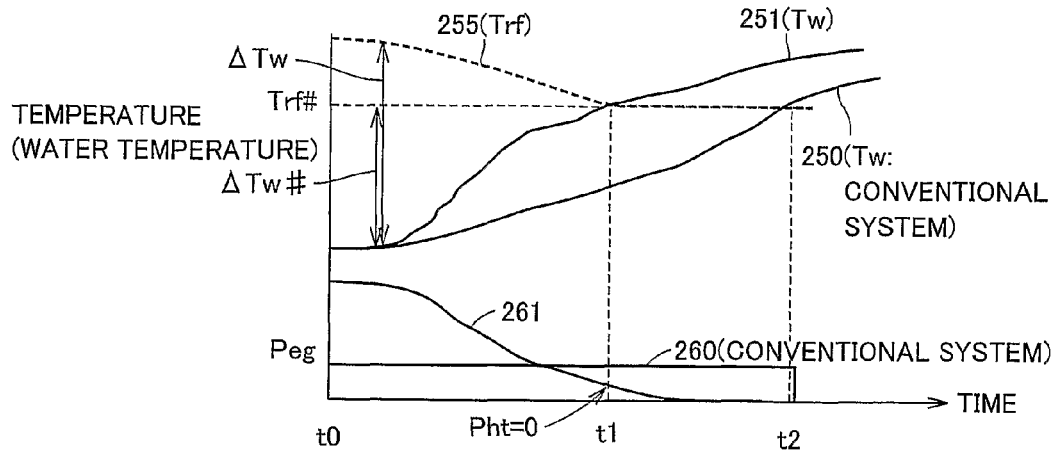
FIG. 2 illustrates engine operation with respect to the temperature of engine cooling water.

FIG. 2 illustrates engine operation of a conventional system and the embodiment of the present invention with respect to the temperature of engine cooling water.

Referring to FIG. 2, at time t0, an ignition key is turned on. As indicated by reference 250, cooling water temperature Tw at this time is considerably lower than a preset temperature Trf# for performing desired heating by means of the air conditioning apparatus, since it is supposed here that it is winter for example and the outside air temperature is low.

As for the conventional system, at start-up of the hybrid vehicle, the vehicle driving force is basically supplied by motor 80 as discussed above while engine 10 is operated in a no-load condition (idle condition) for increasing cooling water temperature Tw as indicated by reference 260. More specifically, engine output power demand Peg is set at a level requesting idling operation only.

Waste heat from idled engine 10 causes cooling water temperature Tw to gradually increase to reach preset temperature Trf# at time t2 as indicated by reference 250. Accordingly, engine output power demand Peg for increasing cooling water temperature Tw becomes equal to zero (Peg=0). At time t2 and thereafter, an engine output demand is made according to vehicle conditions and, in this state, intermittent engine operation can be performed. Namely, at time t2 and thereafter, fuel economy enhancement by hybrid effects can be expected for the first time.

As seen from the above, the conventional system takes a long time to increase cooling water temperature Tw to preset temperature Trf# (period between t0 and t2 in FIG. 2) and accordingly engine 10 is idled for a long time, resulting in deterioration in fuel economy.

Thus, the hybrid vehicle of the present invention controls the temperature of the engine cooling water as discussed below.

Figure 3:
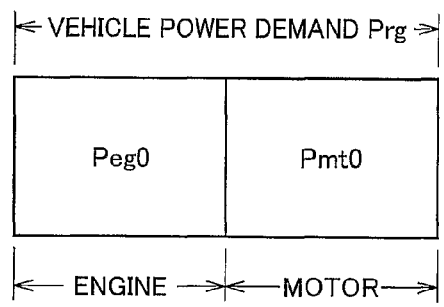
FIG. 3 is a first illustration showing setting of driving force shares to be generated by an engine and a motor respectively under temperature control of the engine cooling water by the heating control system of the present invention.
Figure 4:
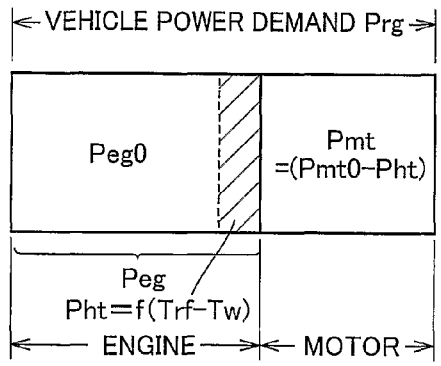
FIG. 4 is a second illustration showing setting of driving force shares to be generated by the engine and the motor respectively under the temperature control of the engine cooling water by the heating control system of the present invention.

FIGS. 3 and 4 show setting of respective shares of driving force to be born by engine 10 and motor 80 for controlling the temperature of the engine cooling water by the heating control system of the present invention.

Referring to FIG. 3, basically from the standpoint of fuel economy enhancement, ECU 90 takes into account the efficiency of engine 10 to determine the ratio between respective shares of driving force to be born by engine 10 and motor 80 (driving force share ratio). Namely, in order to most efficiently control engine 10, ECU 90 divides the total vehicle power demand Prg into engine output power demand Peg0 and motor output power demand Pmt0. This operation by ECU 90 corresponds to "driving force share determination means" of the present invention.

This primary driving force share ratio based on the aforementioned standpoint can be determined by any known method. For example, a table indicating the driving force share ratio correlated with a required vehicle power demand and operating conditions for example may be prepared and provided in ECU 90 to determine the primary driving force share ratio.

According to the present invention, the engine cooling water temperature is controlled by correcting the driving force share ratio which is primarily determined as described in connection with FIG. 3, according to requirements in controlling the engine cooling water temperature. This correction is made when cooling water temperature Tw is lower than preset temperature Trf# of the engine cooling water (Tw<Trf#). In other words, the correction is made when the temperature of the engine cooling water is low and thus sufficient heating ability cannot be achieved.

Referring to FIG. 4, when cooling water temperature Tw is lower than preset temperature Trf# of the engine cooling water, ECU 90 determines an engine output power increase Pht according to the cooling water temperature to increase the share of the driving force to be generated by engine 10 and accordingly correct the primarily determined driving force share ratio. Thus, the engine output power demand is corrected to Peg (Peg=Peg0+Pht) and the motor output power demand is corrected to Pmt (Pmt=Pint0−Pht). Here, engine output power increase Pht is determined, as detailed hereinlater, according to the temperature difference between a control target temperature Trf reflecting preset temperature Trf# and cooling water temperature Tw.

When cooling water temperature Tw is equal to or higher than preset temperature Trf# (Tw≧Trf#), the driving force share ratio described in connection with FIG. 3 is maintained so that the engine output power demand is set to Peg (Peg=Peg0) and the motor output power demand is set to Pmt (Pmt=Pmt0).

In order to allow respective outputs from engine 10 and motor 80 to be desired ones, ECU 90 provides respective command values corresponding to engine output power demand Peg and motor output power demand Pmt to engine 10 and motor 80.

Figure 5:
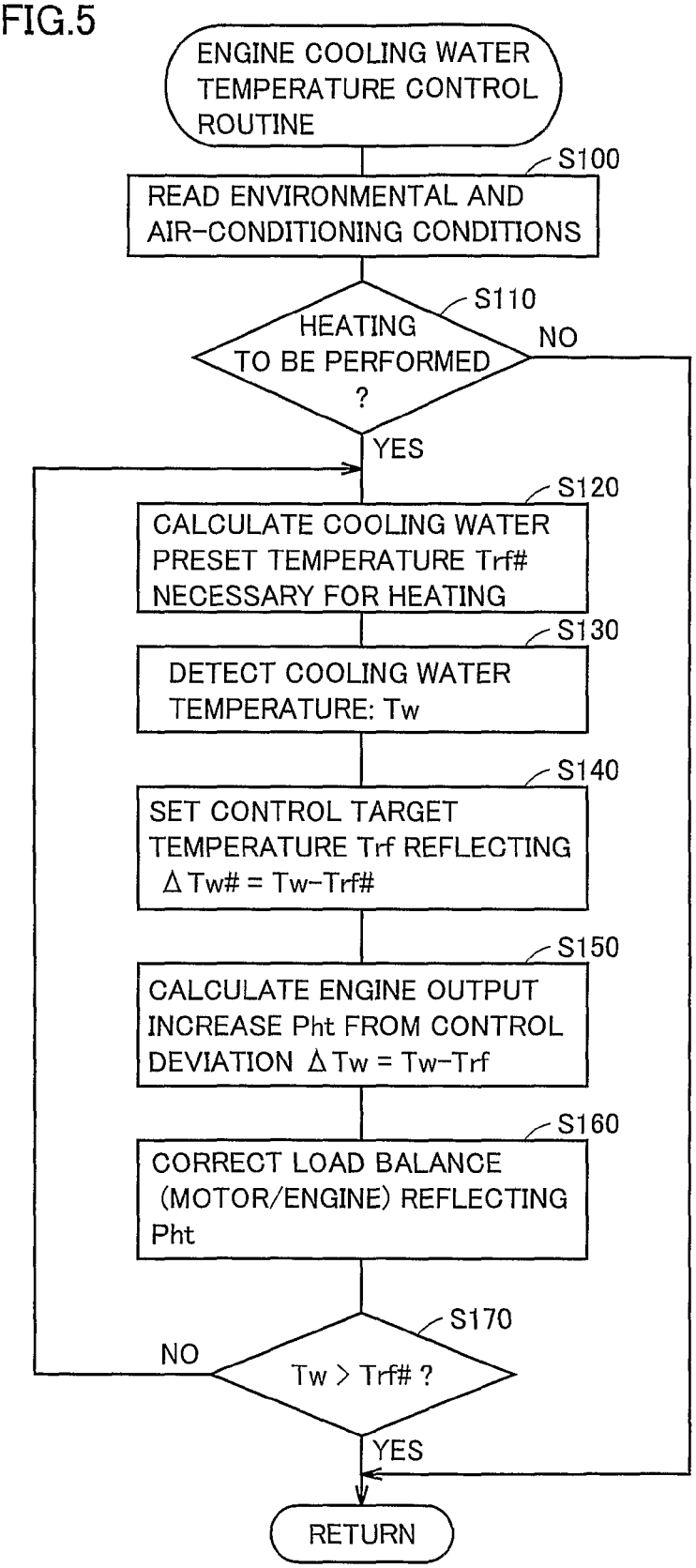
FIG. 5 is a flowchart illustrating the temperature control of the engine cooling water for a hybrid vehicle to which the heating control system of the present invention is applied.

FIG. 5 is a flowchart illustrating control of the engine cooling water temperature of the hybrid vehicle by the heating control system of the present invention.

Referring to FIG. 5, the control of the engine cooling water temperature by the heating control system of the present invention is provided as one of subroutines executed by ECU 90. The routine of the control of the engine cooling water temperature is started in response to, for example, start-up of the vehicle, specifically turn-on of the ignition key.

The routine of the control of the engine cooling water temperature is started and then sunshine sensor 92, outside air temperature sensor 94 and room temperature sensor 96 read such environmental conditions as the amount of sunshine, outside air temperature and room temperature. In addition, such air-conditioning conditions as an air-conditioning temperature setpoint and operation mode (heating/cooling) are read (step S100).

From the environmental conditions and air-conditioning conditions read in step S100, it is determined whether or not air conditioning apparatus 110 should perform heating (step S110). When the heating is to be performed, the routine proceeds to step S120. If the operation mode of air conditioning apparatus 110 can be set to heating operation (operation of only heating the air by heater core 122), the determination in step S110 may be made based on this setting.

When it is determined that the heating is to be performed in step S110, preset temperature Trf# of the engine cooling water that is necessary for heating is calculated from the environmental and air-conditioning conditions read in step S100 (step S120).

For example, this preset temperature Trf# can be determined as a function of such environmental conditions as amount of sunshine Ts, outside air temperature Ta and room temperature Tr. Namely, the determined preset temperature may be Trf# (Trf#=f (Ts, Ta, Tr)).

Further, water temperature sensor 98 (FIG. 1) detects cooling water temperature Tw at this time (step S130). Then, control target temperature Trf is calculated to reflect temperature difference ΔTw# (ΔTw#=Tw−Trf#) defined by the difference between cooling water temperature Tw measured in step S130 and preset temperature Trf# (step S140).

Figure 6:
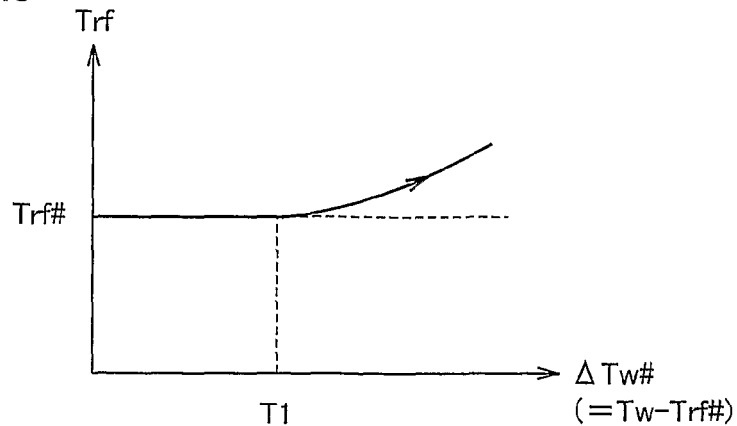
FIG. 6 conceptually shows how a control target temperature is set.

Referring to FIG. 6, control target temperature Trf is set, when temperature difference ΔTw# is equal to or smaller than a predetermined value T1 (T1>0), at a value which is substantially identical to preset temperature Trf#. In contrast, when temperature difference ΔTw# is larger than predetermined value T1, control target temperature Trf is set higher than preset temperature Trf#. In particular, an amount of increase of the control target temperature (namely Trf−Trf#) is set according to temperature difference ΔTw#.

Referring again to FIG. 5, control target temperature Trf which is set in step S140 is used to calculate a control temperature deviation ΔTw (ΔTw=Tw−Trf). Further, according to control temperature deviation ΔTw, engine output power increase Pht shown in FIG. 4 is calculated (step S150).

Then, engine output power increase Pht calculated in step S150 is used to correct, as described in connection with FIG. 4, the load balance between motor 80 and engine 10, namely the driving force share ratio (step S160).

It is noted that engine output power demand Peg0 and motor output power demand Pmt0 determined in consideration of efficiency of engine 10 are set appropriately by a subroutine program separate from the one shown in FIG. 5.

The operations in steps S120-S160 are repeated in predetermined cycles according to the determination as to whether cooling water temperature Tw is higher than preset temperature Trf# (step S170), until cooling water temperature Tw reaches preset temperature Trf#.

When cooling water temperature Tw becomes higher than preset temperature Trf#, the control routine of the cooling water temperature for heating is ended.

Referring again to FIG. 2, regarding hybrid vehicle 100 in the present embodiment of the invention, in the period immediately after start-up of the vehicle (time t0) in which control temperature deviation ΔTw is large, the driving force share to be born by engine 10 is increased as described in connection with FIG. 4. Accordingly, as indicated by reference 261, engine output power demand Peg is larger than the one in the state in which the engine is idled (reference 260). In other words, the amount of heat generated from engine 10 increases, and the operation of engine 10 can thus be changed so as to allow the cooling water temperature to increase.

Accordingly, as indicated by reference 251, cooling water temperature Tw rises faster than the one in the state in which engine 10 is idling (reference 250). Namely, cooling water temperature Tw reaches preset temperature Trf# at time t1 preceding time t2 at which the cooling water temperature reaches the preset temperature in the conventional configuration.

Since engine output power increase Pht (FIG. 4) decreases as cooling water temperature Tw rises, engine output power demand Peg gradually decreases as indicated by reference 261. At time t1 and thereafter, engine output power increase Pht for increasing cooling water temperature Tw is zero (Pht=0) and thus intermittent operation of the engine can be performed.

As discussed above, when engine cooling water temperature Tw does not reach preset temperature Trf# which is necessary for performing desired heating by the air conditioning apparatus, the heating control system of the present invention applied to the hybrid vehicle can control the temperature of the engine cooling water by increasing the share of driving force to be born by the engine. In this way, the engine cooling water temperature under a low-temperature condition can quickly be increased to promptly implement intermittent operation of engine 10, which can be performed after the engine cooling water temperature reaches the preset temperature, and thus fuel economy of the hybrid vehicle can be enhanced.

Further, as shown in step S140 of FIG. 5, the heating control system of the present invention controls the engine cooling water temperature to reflect temperature difference ΔTw# between cooling water temperature Tw and preset temperature Trf# in control target temperature Trf and thereby allow cooling water temperature Tw to more promptly reach preset temperature Trf#.

Figure 7:
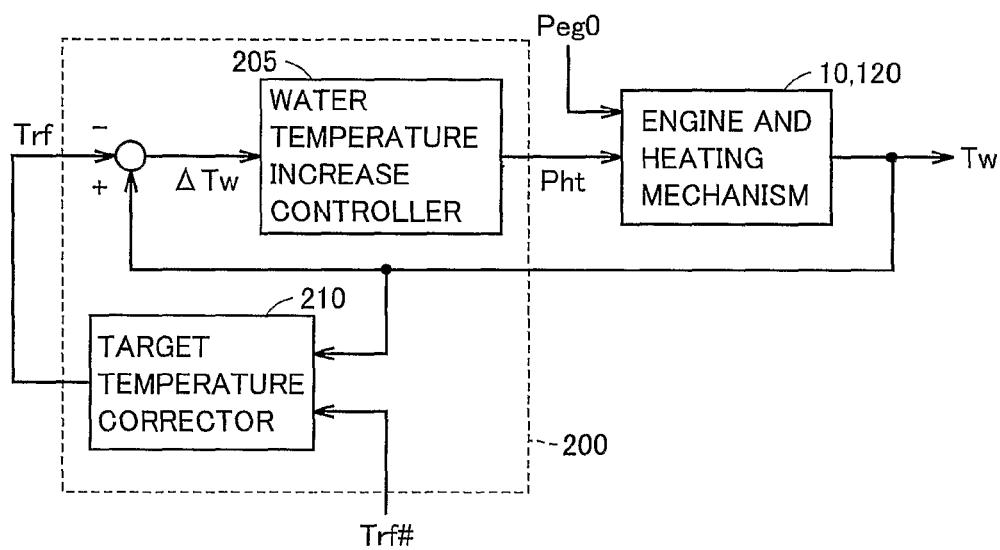
FIG. 7 is a block diagram generally illustrating the temperature control of the engine cooling water by the heating control system of the present invention.

FIG. 7 shows a general block diagram illustrating control of the engine cooling water temperature by the heating control system of the present invention, including setting of the control target temperature.

Referring to FIG. 7, an engine cooling water temperature control system 200 in accordance with the flowchart shown in FIG. 5 includes a water temperature increase controller 205 and a target temperature corrector 210. As described above, the control calculation by engine cooling water temperature control system 200 is programmed in advance in ECU 90 so that the control is executed when cooling water temperature Tw is lower than preset temperature Trf#.

The configuration shown in FIG. 7 has the following correspondence with that of the present invention. Water temperature increase controller 205 corresponds to "water temperature increase means" and target temperature corrector 210 corresponds to "control target temperature setting means."

According to control temperature deviation ΔTw (ΔTw=Tw−Trf) corresponding to the temperature difference between cooling water temperature Tw and control target temperature Trf, water temperature increase controller 205 calculates engine output power increase Pht (FIG. 4). The engine output is increased from original engine output power demand Peg0 by engine output power increase Pht, the amount of heat generated from the engine is accordingly increased, and thus the engine operation can be changed so as to allow the engine cooling water temperature to increase.

Water temperature increase controller 205 may be implemented by a table look-up system with which a predetermined table is sequentially referred to, the table defining the correlation between control temperature deviation ΔTw and engine output power increase Pht in one-dimensional or multi-dimensional manner. Alternatively, the controller may be a controller performing such well-know control operations as P (proportion), I (integration) and D (differentiation) in combination or a controller following any of known control systems.

Namely, the operation of water temperature increase controller 205 corresponds to step S150 shown in FIG. 5. In accordance with the control of the engine cooling water temperature by the heating control system of the present invention, engine output power increase Pht is variably set according to control temperature deviation ΔTw. Thus, cooling water temperature Tw can promptly approach preset temperature Trf# and overshoot from preset temperature Trf# can be prevented. Fuel economy can accordingly be improved without excessive generation of waste heat from engine 10.

Engine cooling water temperature Tw increases according to engine output power demand Peg that is the sum of original engine output power demand Peg0 (FIG. 3) and engine output power increase Pht.

Target temperature corrector 210 sets control target temperature Trf according to cooling water temperature Tw so that preset temperature Trf# which is necessary for heating by air conditioning apparatus 110 is reflected in the target temperature. Namely, the operation of target temperature corrector 210 corresponds to step S140 shown in FIG. 5. As seen from FIG. 6, when temperature difference ΔTw# defined by the difference between preset temperature Trf# and cooling water temperature Tw is smaller than a predetermined value, target temperature corrector 210 uses preset temperature Trf# as control target temperature Trf. When temperature difference ΔTw# is larger than the predetermined value, target temperature corrector 210 sets control target temperature Trf higher than preset temperature Trf#.

Then, as indicated by reference 255 in FIG. 2, in a region where cooling water temperature Tw is low (e.g. immediately after time t0), control temperature deviation ΔTw is larger than above-described temperature difference ΔTw#. Thus, as compared with the configuration by which preset temperature Trf# is used all the time as the control target temperature of engine cooling water control system 200, the present configuration can more promptly increase cooling water temperature Tw since the engine output power demand and engine waste heat are increased.

As cooling water temperature Tw reaches preset temperature Trf#, ISC (Idle Speed Control) is started that is automatic control for keeping the engine idle rpm stably at a target value. The start of ISC indicates that the vehicle condition reaches a steady condition. For example, OBD (On Board Diagnosis) required by law in the US is started in response to the start of ISC.

The control system as discussed above corrects the control target temperature according to the cooling water temperature. Therefore, even in such a case where short-period intermittent operation, during which any conventional control system cannot sufficiently increase the cooling water temperature, is repeatedly performed, the present invention can promptly increase the cooling water temperature. Accordingly, fuel economy can be enhanced and the opportunity for check by OBD can be increased.

The control system as shown in FIG. 7 with which the control target temperature is corrected according to the cooling water temperature is applicable not only hybrid vehicles but also AT (Automatic Transmission) vehicles and CVT (Continuously Variable Transmission) vehicles for example that are generally used automobiles (vehicles) having only an engine as driving power source.

Figure 8:
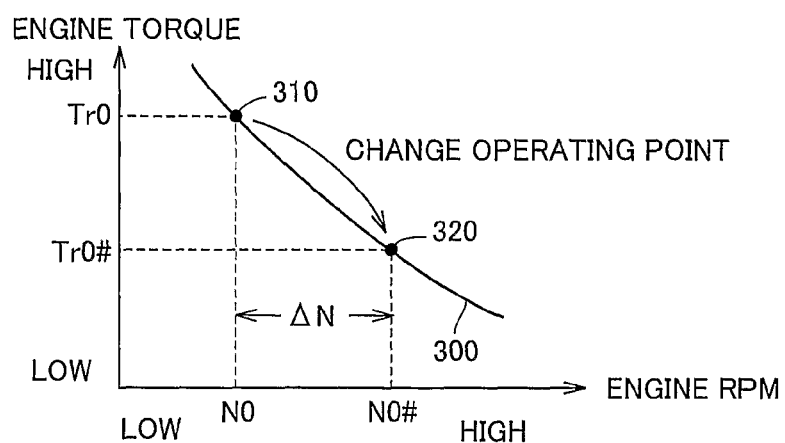
FIG. 8 shows how an operating point of the engine is set when the temperature control of the engine cooling water by the heating control system of the present invention is applied to any vehicle other than the hybrid vehicle.

As shown in FIG. 8, such vehicles as AT vehicles and CVT vehicles need engine output power corresponding to vehicle power demand that is necessary for driving the vehicle. In this case, on an equipower curve 300, there are a plurality of operating points of the engine at which the same engine output power can be obtained.

For example, an operating point 310 at which the engine rpm is equal to N0 and the engine torque is equal to Tr0 and an operating point 320 at which the engine rpm is equal to N0# and the engine torque is equal to Tr0# are present on the same equipower curve 300. Therefore, both of operating points 310, 320 provide substantially the same engine output power.

Operating point 310 is a point at which most efficient control of the engine is implemented as implemented by the primary driving force share ratio for the hybrid vehicle. At operating point 320, engine output power which is substantially the same as that of operating point 310 can be obtained and the engine rpm is higher by ΔN (ΔN=N0#·N0) as compared with operating point 310. Therefore, the operating point can be changed from 310 to 320 to increase frictional heat from rotations of the engine and thereby increase the amount of heat generated by the engine. In other words, the operation of the engine can be changed so as to allow the temperature of the engine cooling water to increase.

By water temperature increase controller 205 shown in FIG. 7, the amount of increase ΔN of the engine rpm to be caused by changing the operating point is calculated according to control temperature deviation ΔTw and, according to the calculated ΔN, operating point 320 after the change is determined. Thus, the amount of increase of heat generated by engine that is caused by the change of the operating point can variably be set according to control temperature deviation ΔTw.

More specifically, ECU 90 may be programmed to allow water temperature increase controller 205 shown in FIG. 7 to execute the above-discussed control operation, and accordingly the engine cooling water temperature control by the heating control system of the present invention can be applied to generally used automobiles (e.g. AT vehicles and CVT vehicles) in addition to the hybrid vehicles. Namely, like the control for the hybrid vehicle, the temperature of the engine cooling water may be controlled as shown in FIG. 7 to promptly increase the engine cooling water temperature to a preset temperature.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

The present invention is applicable to vehicles having an air conditioning apparatus that uses thermal energy derived from cooling water of an internal combustion engine to perform heating.

The invention claimed is:

1. A heating control system for a vehicle having an internal combustion engine generating driving force of the vehicle from thermal energy generated by burning fuel, comprising:
an air conditioning apparatus using thermal energy derived from cooling water of said internal combustion engine;
a water temperature measurement unit measuring temperature of said cooling water;
control target temperature setting means for setting a control target temperature of said cooling water based on a preset temperature corresponding to a temperature of said cooling water that is necessary for performing heating by said air conditioning apparatus and based on a cooling water temperature measured by said water temperature measurement unit; and
water temperature increase means for changing, when said cooling water temperature is lower than said preset temperature, operation of said internal combustion engine to allow an amount of heat generated by said internal combustion engine to increase, according to a control amount calculated according to a deviation between said control target temperature and said cooling water temperature, wherein
said control target temperature setting means sets said control target temperature at said preset temperature when a temperature difference between said preset temperature and said cooling water temperature is at most a predetermined value and sets said control target temperature higher than said preset temperature when said temperature difference is larger than said predetermined value,
said vehicle further has an electric motor generating driving force of the vehicle from electrical energy,
said control amount is an amount of increase in output power of said internal combustion engine, and
when said cooling water temperature is lower than said preset temperature, said water temperature increase means determines a driving force share ratio that is a ratio between respective shares of driving force to be generated by said internal combustion engine and said electric motor, so that an output power demand on said internal combustion engine which is a part of an output power demand on the vehicle as a whole is higher by said amount of increase in output power calculated according to said deviation, relative to a case where said cooling water temperature is not lower than said preset temperature.

2. The heating control system for the vehicle according to claim 1, wherein
said control target temperature setting means sets a difference between said preset temperature and said control target temperature according to the temperature difference between said preset temperature and said cooling water temperature.

3. The heating control system for the vehicle according to claim 1, further comprising driving force share determination means for primarily determining said driving force share ratio in consideration of efficiency of said internal combustion engine, wherein
said water temperature increase means increases, when said cooling water temperature is lower than said preset temperature, the ratio of the share to be generated by said internal combustion engine in accordance with said amount of increase in output power according to said deviation.

4. The heating control system for the vehicle according to claim 1, wherein the control target temperature setting means sets the control target temperature of the cooling water during operation of the internal combustion engine.

5. The heating control system for the vehicle according to claim 1, wherein said preset temperature is variable based on environmental conditions and an instruction to said air conditioning apparatus.

* * * * *